United States Patent
Jammoussi et al.

(10) Patent No.: US 9,885,305 B2
(45) Date of Patent: Feb. 6, 2018

(54) METHOD FOR REDUCING CYLINDER AIR-FUEL RATIO IMBALANCE

(71) Applicant: Ford Global Technologies, LLC, Dearborn, MI (US)

(72) Inventors: Hassene Jammoussi, Canton, MI (US); Imad Hassan Makki, Dearborn Heights, MI (US); Robert Roy Jentz, Westland, MI (US); Michael Igor Kluzner, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 185 days.

(21) Appl. No.: 15/052,688

(22) Filed: Feb. 24, 2016

(65) Prior Publication Data
US 2017/0241369 A1  Aug. 24, 2017

(51) Int. Cl.
| | | |
|---|---|---|
| F02D 41/14 | (2006.01) | |
| F02B 75/18 | (2006.01) | |
| F02D 41/00 | (2006.01) | |
| F02D 41/26 | (2006.01) | |
| F02D 43/04 | (2006.01) | |
| F02P 5/15 | (2006.01) | |
| F02D 41/20 | (2006.01) | |
| F02D 41/28 | (2006.01) | |

(52) U.S. Cl.
CPC ......... *F02D 41/1458* (2013.01); *F02B 75/18* (2013.01); *F02D 41/0002* (2013.01); *F02D 41/0097* (2013.01); *F02D 41/1497* (2013.01); *F02D 41/26* (2013.01); *F02D 43/04* (2013.01); *F02P 5/1512* (2013.01); *F02D 2041/1432* (2013.01); *F02D 2041/2051* (2013.01); *F02D 2041/281* (2013.01); *F02D 2041/288* (2013.01); *F02D 2200/101* (2013.01)

(58) Field of Classification Search
CPC .. F02D 41/0002; F02D 41/30; F02D 41/3005; F02D 41/1454; F02D 41/1458; F02D 41/1497; F02D 41/1498; F02D 2250/28; F02D 2200/101; F02D 2041/1432
USPC .......... 123/436, 673; 701/101–104
See application file for complete search history.

(56) References Cited

U.S. PATENT DOCUMENTS

| | | | |
|---|---|---|---|
| 4,058,094 A * | 11/1977 | Moore | F02D 11/10 123/356 |
| 5,278,760 A | 1/1994 | Ribbens et al. | |
| 6,018,694 A * | 1/2000 | Egami | B60K 6/24 180/65.23 |
| 6,668,812 B2 | 12/2003 | Javaherian | |

(Continued)

OTHER PUBLICATIONS

Leone, Thomas G. et al., "System for Piston Cooling," U.S. Appl. No. 14/688,800, filed Apr. 16, 2015, 57 pages.

(Continued)

*Primary Examiner* — Stephen K Cronin
*Assistant Examiner* — Robert Werner
(74) *Attorney, Agent, or Firm* — Julia Voutyras; McCoy Russell LLP (57) ABSTRACT

Methods and systems are described for monitoring air/fuel imbalance in cylinders of an engine. Engine speed signals are sampled and then run through a notch filter set to the sampling frequency. Based on a first frequency content of the resulting filtered engine speed, cylinder imbalance is detected and addressed.

18 Claims, 10 Drawing Sheets

(56) References Cited

U.S. PATENT DOCUMENTS

| | | | |
|---|---|---|---|
| 8,353,265 B2 | 1/2013 | Pursifull | |
| 2013/0184969 A1* | 7/2013 | Rollinger | F02D 41/22 |
| | | | 701/103 |
| 2016/0032845 A1 | 2/2016 | Boyer et al. | |

OTHER PUBLICATIONS

Rollinger, John Eric et al., "Method for Air/Fuel Imbalance Detection," U.S. Appl. No. 14/928,883, filed Oct. 30, 2015, 56 pages.

* cited by examiner

METHOD FOR REDUCING CYLINDER AIR-FUEL RATIO IMBALANCE

FIELD

The present description relates generally to methods and systems for detecting and addressing air-fuel imbalances in a cylinder based on crankshaft acceleration signals.

BACKGROUND/SUMMARY

Cylinder-to-cylinder variations in combustion associated with air-fuel ratio imbalances may occur in engines for various reasons. For example, cylinder-to-cylinder air-fuel ratio imbalances may occur due to cylinder-to-cylinder variation in intake valve depositions, plugged exhaust gas recirculation (EGR) orifices, electrical issues, air leaks, and/or shifted fuel injectors. When an air-fuel ratio imbalance occurs in one or more cylinders, engine performance is degraded. In addition, an engine may not be able to maintain emissions compliance and fuel economy may be reduced.

One example approach for detecting air-fuel ratio imbalance is shown by Javaherian in U.S. Pat. No. 6,668,812. Therein, a time sequential series of signals are collected from an exhaust oxygen sensor over at least one engine cycle at current engine speed and load conditions, and the series of signals are converted by discrete Fourier transformation to a vector of air-fuel ratio imbalances at a specified frequency. The vector is then projected onto two fuel imbalance reference vectors of known magnitude and phase corresponding to the discrete Fourier transform of two nominal fuel imbalance patterns for the current engine speed and load. The reference vectors are previously calibrated and stored in the memory of an engine controller. An air-fuel imbalance in a cylinder is detected based on deviation of the sampled vector from the reference vector.

However, the inventors herein have recognized a potential issue with such systems. Detecting air-fuel imbalances using the method of U.S. Pat. No. 6,668,812 may be time, cost, and computation intensive due to the presence of high sampling rates and the complexity of the required vector transformation. In particular, the reliance on Fast Fourier Transformation (FFT) can result in delays in detecting and addressing air-fuel ratio imbalances.

The inventors herein have recognized the above issues and identified an approach to at least partly address the above issues. In one example, the issues described above may be addressed by a method for normalizing engine speed content at a selected frequency with respect to variations in a crankshaft angle by sampling engine speed synchronous with engine firing events, processing sampled engine speeds using a Notch filter at the selected frequency, and identifying a cylinder imbalance based on the normalized sampled signal. In this way, analysis in a frequency domain of sampled engine speed values can be done using a Notch filter, simplifying detection of cylinder imbalance, without compromising the reliability of results.

As one example, a sequential series of sampled engine speed values may be collected within an engine cycle of an engine wherein all the cylinders are aimed to be controlled at stoichiometry. The sampled values may then be filtered using a discrete Notch filter set to a frequency of once per engine cycle. Additionally, before processing the sampled values with a notch filter, the samples values may be normalized with respect to variations in crankshaft angle and stored in the memory of an engine controller. Therein, engine speed signals are sampled during the power stroke of each firing cylinder and the estimated acceleration is normalized based on the torque of each cylinder by scaling based on deviation of spark timing from MBT spark. In order to detect presence of an air/fuel imbalance in an engine cylinder, engine speed content may be sampled at multiple points within an engine firing event. The sampling frequency may be adjusted based on the engine configuration and cylinder firing frequency, and in one example is an integer multiple of engine firing frequency. The sampled data is then processed using a discrete Notch filter set to the sampling frequency and with values to cancel a once per engine cycle frequency to obtain a frequency domain characterization of engine speed. The Notch filter output is deducted from the original signal. The processed output magnitude is then compared to a threshold. Based on the magnitude relative to the threshold, the presence of a cylinder imbalance may be determined. In addition, a degree of imbalance and a directionality of the imbalance (that is, whether the imbalance is richer or leaner than stoichiometry) may also be determined based on the magnitude and phase of the processed output. Engine parameters may then be adjusted to reduce the imbalance. For example, fueling of the imbalanced cylinder may be adjusted to correct for the imbalance.

In this way, cylinder-to-cylinder variations in air/fuel ratio may be monitored. The technical effect of applying a discrete Notch filter for frequency domain characterization of engine speed content is that air/fuel ratio imbalances may be detected using faster and simpler processing methods. In particular, the need for complex, time and computation intensive processing methods, such as Fourier transformation, is reduced, without reducing the accuracy of air/fuel ratio imbalance detection. Overall, by identifying air/fuel imbalance of a cylinder with higher reliability, emissions may be reduced and engine performance may be enhanced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
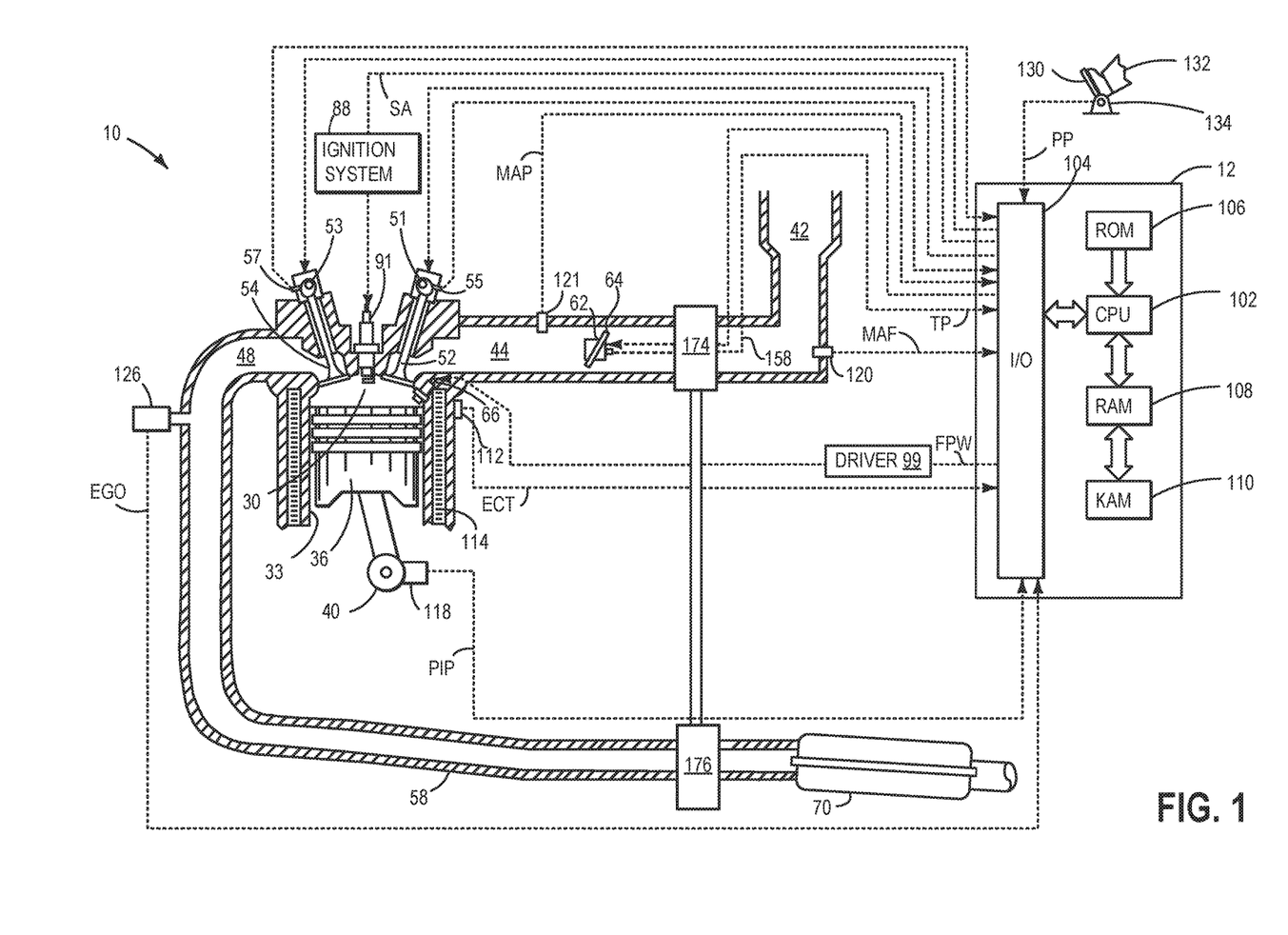
FIG. 1 shows a schematic diagram of an example engine system.
Figure 2:
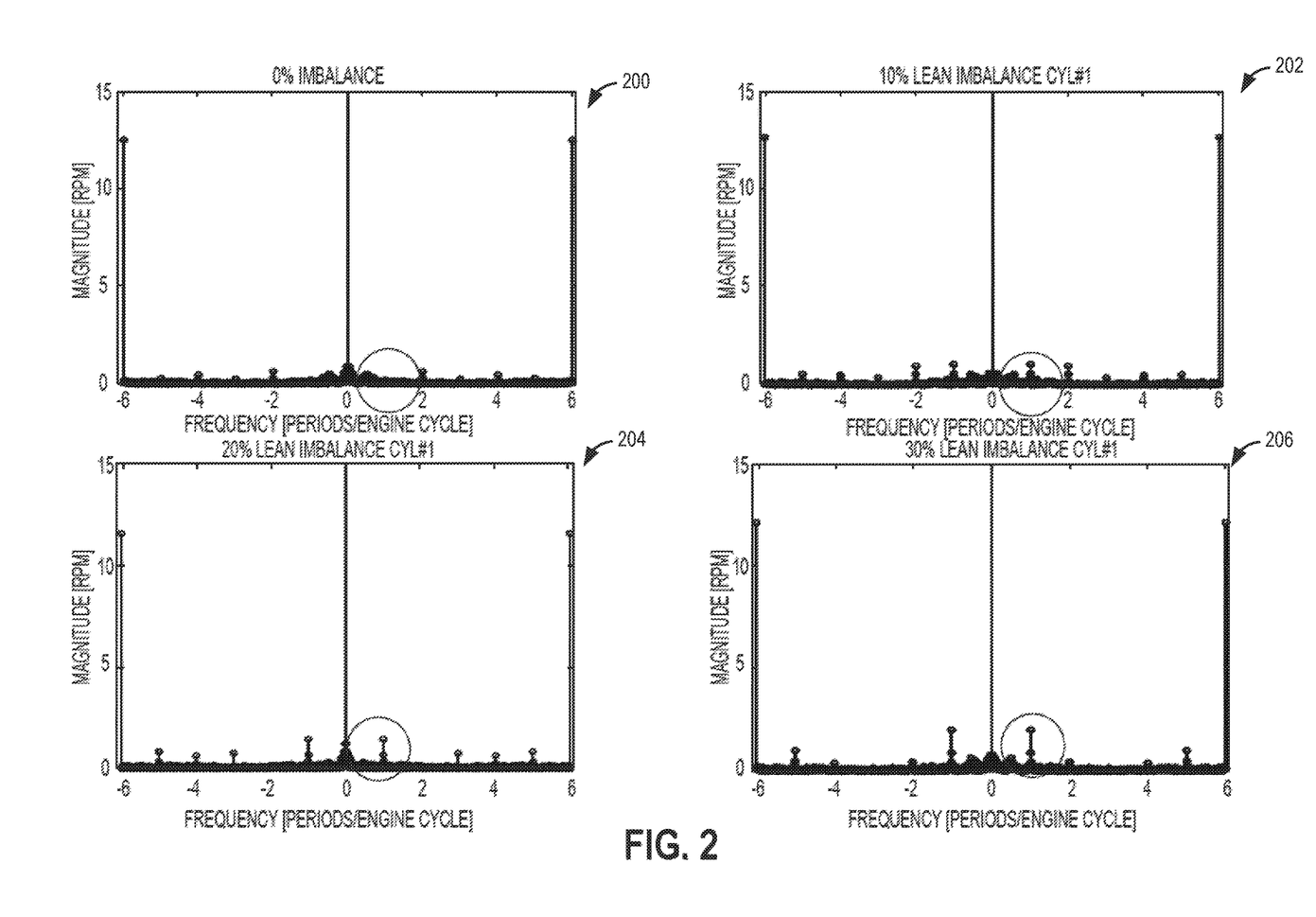
FIG. 2 depicts a map showing frequency content of a cylinder at idle at varying degrees of imbalance, in an engine, such as the engine system of FIG. 1.
Figure 6:
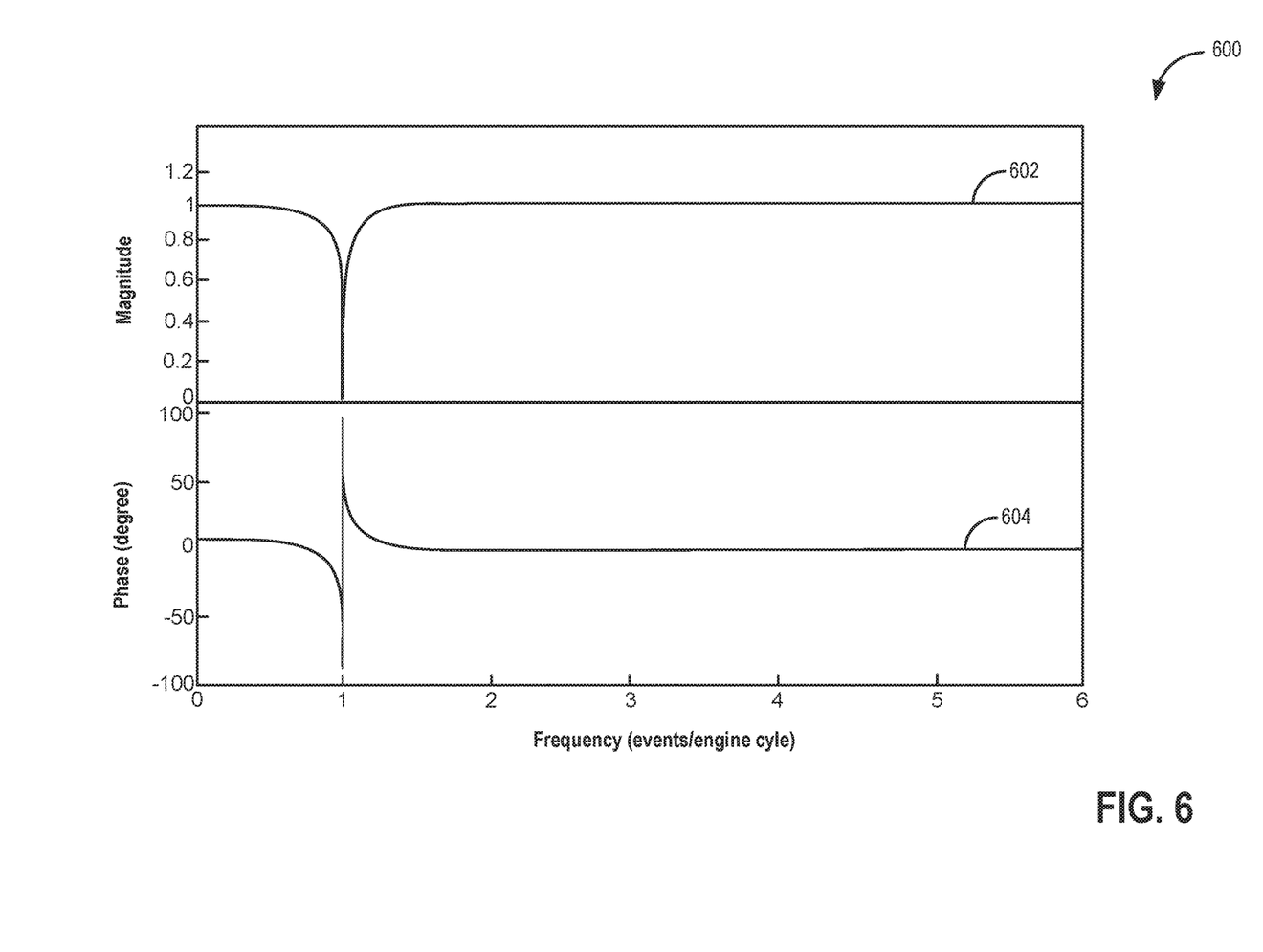
FIG. 6 depicts an example map of the frequency response of the Notch filter.
Figure 7:
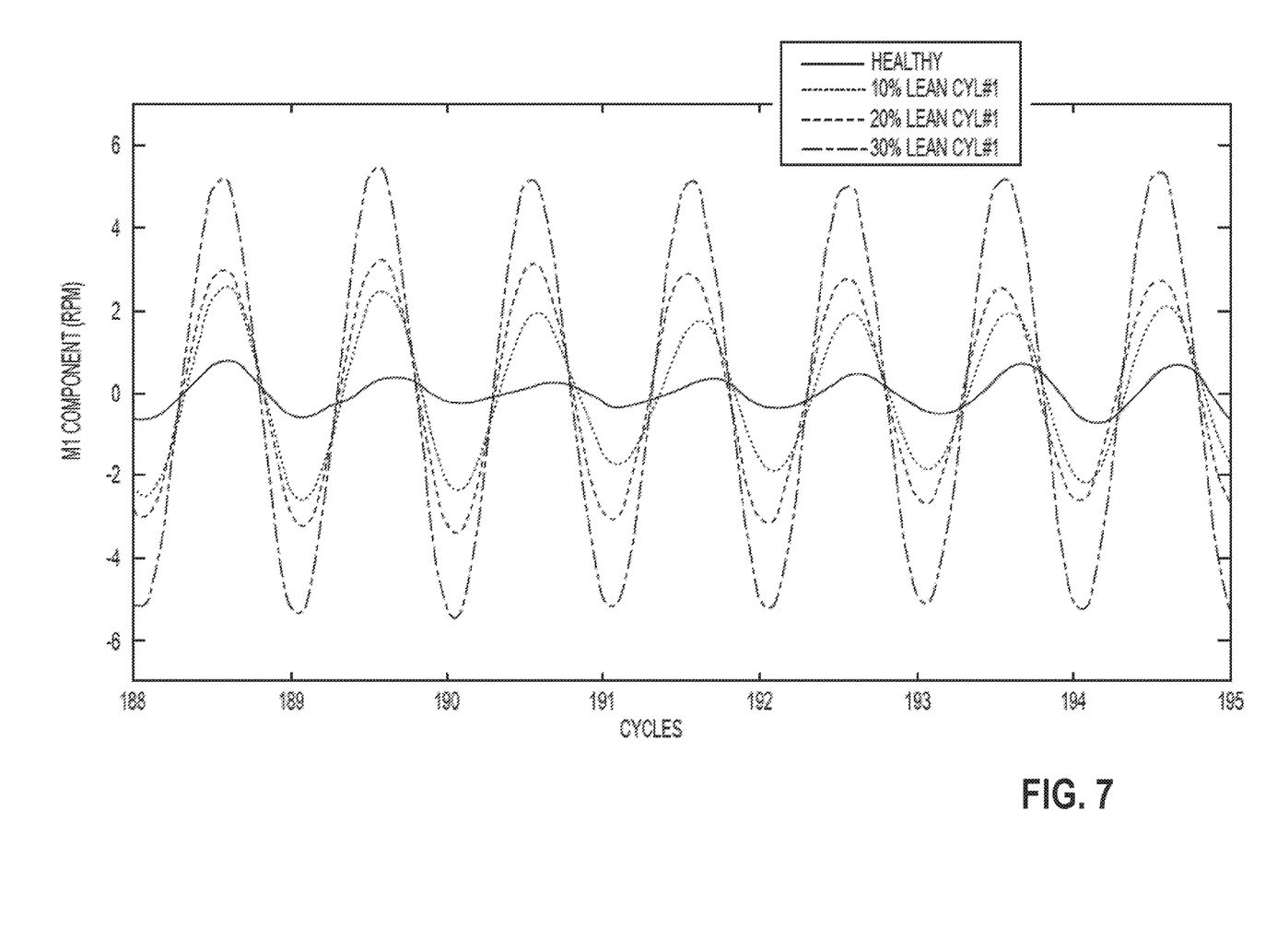
FIG. 7 shows an example comparison map of filtered engine speed signal at different degrees of lean imbalance.

The following description relates to systems and methods for identifying potential air/fuel imbalance of cylinders in an engine, such as the engine of FIG. 1. An example map showing a comparison of frequency domain characterization using discrete Fourier transformation of engine speed under engine idle conditions at stoichiometry and varying degrees of lean imbalance is depicted in FIG. 2. An engine controller may be configured to perform a control routine for air/fuel imbalance monitoring, such as shown with reference to FIGS. 3 and 5, to perform a frequency domain characterization of engine speed with respect to variations in crankshaft accelerations via a discrete Notch filter in which only a narrow frequency band of contiguous frequencies, or a single frequency, are/is passed through to the filter output. The output obtained using the Notch filter may be responsive to variations at a selected multiple of firing frequency, e.g., once per engine cycle (two engine revolutions for a 4-stroke engine) (FIG. 6). Changes in magnitude of the filter output relative to that of a reference signal may be used to detect the presence and extent of cylinder imbalance (FIG. 7). Example signal processing of sampled data is shown with reference to FIGS. 8-9. Overall, cylinder air/fuel imbalance may be learned accurately using a less time and computation intensive approach.

FIG. 1 shows a schematic depiction of an example cylinder 30 in internal combustion engine 10. Cylinder 30 may also be termed combustion chamber 30, herein. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP.

Combustion chamber 30 of engine 10 may include combustion chamber walls 33 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel (not shown) to enable a starting operation of engine 10.

Combustion chamber 30 may receive intake air from intake manifold 44 via intake passage 42 and may exhaust combustion gases via exhaust manifold 48 and exhaust passage 58. Intake manifold 44 and exhaust manifold 48 can selectively communicate with combustion chamber 30 via respective intake valve 52 and exhaust valve 54. In some embodiments, combustion chamber 30 may include two or more intake valves and/or two or more exhaust valves. In some examples, one or more of the intake passages may include a boosting device such as a turbocharger or a supercharger. For example, FIG. 1 shows engine 10 configured with a turbocharger including a compressor 174 arranged between intake passages 42 and 44, and an exhaust turbine 176 arranged along exhaust passage 48. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine.

In the example of FIG. 1, intake valve 52 and exhaust valve 54 may be controlled by cam actuation via respective cam actuation systems 51 and 53. Cam actuation systems 51 and 53 may each include one or more cams mounted on one or more camshafts (not shown in FIG. 1) and may utilize one or more of cam profile switching (CPS), variable cam timing (VCT), variable valve timing (VVT) and/or variable valve lift (VVL) systems that may be operated by controller 12 to vary valve operation. The angular position of intake and exhaust camshafts may be determined by position sensors 55 and 57, respectively. In alternate embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 99. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30.

Ignition system 88 can provide an ignition spark to combustion chamber 30 via spark plug 91 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Intake manifold 44 is shown communicating with throttle 62 having a throttle plate 64. In this particular example, the position of throttle plate 64 may be varied by controller 12 via a signal provided to an electric motor or actuator (not shown in FIG. 1) included with throttle 62, a configuration that is commonly referred to as electronic throttle control (ETC). Throttle position may be varied by the electric motor via a shaft. Throttle 62 may control airflow from intake passage 42 to intake manifold 44 and combustion chamber 30 (and other engine cylinders). The position of throttle plate 64 may be provided to controller 12 by throttle position signal TP from throttle position sensor 158.

Exhaust gas sensor 126 is shown coupled to exhaust manifold 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 58 downstream of exhaust gas sensor 126. Device 70 may be a three way catalyst (TWC), NOx trap, various other emission control devices, or combinations thereof.

An exhaust gas recirculation (EGR) system (not shown) may be used to route a desired portion of exhaust gas from exhaust passage 58 to intake manifold 44. Alternatively, a portion of combustion gases may be retained in the combustion chambers, as internal EGR, by controlling the timing of exhaust and intake valves.

Controller 12 is shown in FIG. 1 as a conventional microcomputer including: microprocessor unit 102, input/output ports 104, read-only memory 106, random access memory 108, keep alive memory 110, and a conventional data bus. Controller 12 commands various actuators such as canister purge valve (not shown), throttle plate 64, fuel injector 66, and the like. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by vehicle operator 132; a measurement of intake manifold pressure (MAP) from pressure sensor 121 coupled to intake manifold 44; a profile ignition pickup signal (PIP) from Hall effect sensor 118 (or other type) coupled to crankshaft 40; a measurement of air mass entering the engine from mass airflow sensor 120; a measurement of throttle position from sensor 158; and air/fuel ratio (AFR) from EGO sensor 126. In a preferred aspect of the present description, crankshaft sensor 118, which may be used as an engine speed sensor, may produce a predetermined number of equally spaced pulses for every revolution of the crankshaft from which engine speed (RPM) can be determined. Such pulses may be relayed to controller 12 as a profile ignition pickup signal (PIP) as mentioned above. Crankshaft sensor 118 may also be utilized to measure crankshaft accelerations (also termed, crank accelerations).

Storage medium read-only memory 106 can be programmed with computer readable data representing instructions executable by processor 106 for performing various routines not specifically listed herein. The controller 12, thus, receives signals from the various sensors of FIG. 1 and employs the various actuators of FIG. 1 to adjust engine operation based on the received signals and instructions stored on a memory of the controller.

As described above, FIG. 1 merely shows one cylinder of a multi-cylinder engine, and that each cylinder has its own set of intake/exhaust valves, fuel injectors, spark plugs, etc. In one example, engine 10 may include four cylinders arranged in an inline manner. In another example, engine 10 may include six cylinders arranged in a V-configuration. In yet another example, engine 10 may include eight cylinders arranged in a V-configuration. Alternatively, engine 10 may include additional or fewer cylinders without departing from the scope of this disclosure.

A controller, such as controller 12, of the engine may monitor for cylinder air/fuel ratio imbalance at regular intervals to detect cylinder-to-cylinder air/fuel ratio variation. As such, imbalances of air/fuel ratio in cylinders can adversely affect engine performance and engine emissions. As elaborated herein with reference to FIGS. 3-7, air/fuel imbalances may be identified by analyzing frequency harmonics of engine speed using a signal processing Notch filter.

As such, the presence of an air/fuel ratio imbalance in a cylinder may change the frequency spectrum of instantaneous engine speed. The average engine speed may remain close to reference speed for both balanced and unbalanced cylinders because of the fueling control system. However, in case of a healthy engine (wherein all the cylinders are balanced), there is uniform torque production with a very small amplitude of low frequency harmonics whereas in the case of an unhealthy engine (wherein one or more cylinders may be imbalanced), non-uniform torque production causes jumps in the low frequency harmonics spectrum. The controller may determine a cylinder with air/fuel imbalance in the engine by applying the Notch filter to analyze the frequency spectrum produced by the individual cylinders. In particular, the Notch filter may be applied at the sampling frequency. Based on the Notch filtered frequency spectrum deviating in magnitude from a reference Notch filtered spectrum of a balanced cylinder, the controller may determine that an imbalance condition exists, and take appropriate mitigating actions.

Turning now to FIG. 2, it depicts changes in the frequency spectrum of instantaneous engine speed for an engine cylinder. In particular, FIG. 2 shows maps 200-206 depicting the change in frequency content of an engine cylinder at idle speed at varying degrees of imbalance. The idle engine speed content of the engine cylinder is analyzed using Discrete Fourier Transformation (hereafter referred to as DFT). DFT converts a sampled function from its original domain (usually time or position along a line) to a frequency domain. FIG. 2 shows the coefficients of Fourier series for four different scenarios.

The first map 200 shows the frequency content of a cylinder at 0% imbalance. In other words, map 200 depicts a healthy cylinder. As such, in a healthy engine, where all the cylinders are at 0% imbalance, there is uniform torque production that translates to a very small amplitude in low frequency harmonics. However, when an engine is imbalanced, there is non-uniform torque production leading to low frequency harmonics that jump in the frequency spectrum, the magnitude of the low frequency harmonics increasing as cylinder imbalance increases. This is shown by the circled region in maps 200-206, wherein map 202 depicts low frequency harmonics in a cylinder with 10% lean imbalance, map 204 depicts low frequency harmonics in a cylinder with 20% lean imbalance, and map 206 depicts low frequency harmonics in a cylinder with 30% lean imbalance.

While DFT based frequency analysis can be used for detecting cylinder imbalances, reliance on the DFT processing makes the analysis time-consuming, expensive, and complex. As elaborated herein, by using discrete Notch filtering of engine speed content at a frequency corresponding to the sampling frequency, low frequency harmonics may be identified in a more cost, time, and computation efficient manner.

Figure 3:
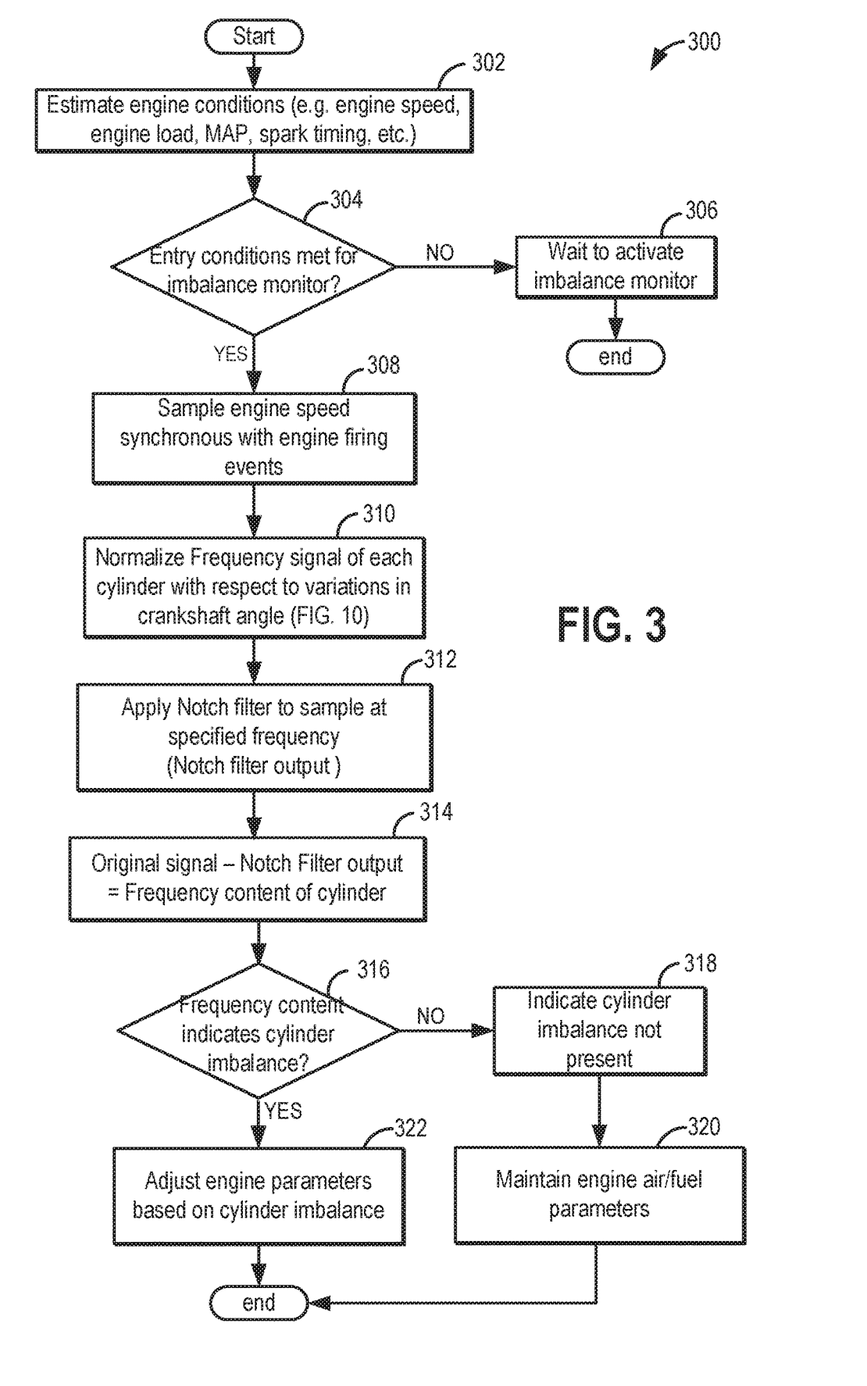
FIG. 3 presents an example flow chart illustrating a routine for determining a cylinder with air/fuel imbalance in an engine, such as the engine system of FIG. 1.

FIG. 3 shows an example method 300 for detecting cylinder air/fuel imbalances in an engine using a discrete Notch filter. Method 300 will be described in relation to the system shown in FIG. 1 but it should be understood that similar routines may be used with other systems without departing from the scope of this disclosure. Instructions for carrying out method 300 as well as other methods included herein may be executed by a controller, such as controller 12 of FIG. 1, based on instructions stored on a memory of the controller and in conjunction with signals received from sensors of the engine system, such as the sensors described above with reference to FIG. 1. The controller may employ engine actuators of the engine system, such as the actuators of FIG. 1 to adjust engine operation and vehicle operation, according to the routines described below.

At 302, method 300 includes estimating and/or measuring engine operating conditions. Example engine operating conditions assessed include engine speed (Ne), engine load, torque demand, MAP, ambient conditions (temperature, pressure, humidity, etc.), spark timing, boost pressure, etc. For example, the controller may receive signals from a MAP sensor, such as MAP sensor 121 of FIG. 1, to determine an existing intake manifold pressure.

Next, at 304, the method includes determining if entry conditions for activating an air/fuel ratio imbalance monitor (herein also referred to as an air/fuel monitor) are met. Various entry conditions for starting the air/fuel monitor may be checked at 304. In one example, entry conditions may be confirmed if a background sample rate (e.g., time-based sampling) and/or a foreground sample rate (e.g., crank-angle domain based sampling) is higher than a threshold rate. In another example, entry conditions may depend on engine operating conditions. For example, entry conditions may be confirmed in response to one or more of engine temperature being warmer than a threshold temperature, engine load being lower than a threshold load, engine speed being lower than a threshold speed, etc. In yet another example, the air/fuel imbalance monitor may only be activated in response to engine steady state conditions, and the monitor may be disabled responsive to transient engine conditions, such as tip-ins, and tip-outs. In still other examples, the monitor may be run according to a predefined schedule, such as once every threshold distance of vehicle travel, once every threshold duration of vehicle travel, once every drive cycle, etc.

If entry conditions are not met, at 306 the method includes delaying the activation of the monitor. That is, the controller may wait to activate the air/fuel imbalance monitor, while nominal engine operation continues. The AFR imbalance routine then ends. The routine may be disabled and rescheduled for a later time, e.g., after a certain number of miles have been driven, after a certain period of time has passed, steady state engine conditions, etc.

However, if entry conditions are met, method 300 progresses to activate the air/fuel ratio imbalance monitor to estimate AFR in each cylinder of the engine. Thus, if entry conditions are met, at 308, method 300 includes sampling engine speed values multiple times within an engine firing event. In particular, the engine speed values may be sampled synchronous with engine firing events. For example, engine speed may be sampled once per firing event. Alternatively, engine speed may be sampled at an integral multiple of the firing frequency. In one example, a crankshaft sensor that monitors the rotational speed of the crankshaft may send PIP signals to the controller. Based on the PIP signals received from the crankshaft sensor, the controller may generate engine speed signals, which may be sampled during an engine firing event. The sampling frequency may be based on the engine configuration and firing frequency. For example, in an in-line 4 cylinder engine, engine speed may be sampled four times every engine cycle.

The sampling frequency can be the frequency or timing allowable by specific hardware. For example, it may be once per firing cycle sampling, or twice per firing cycle sampling (referred to as pip or half pip sampling respectively). The sampling can be more frequent if there is a hardware with a specific tooth synchronized signal. The Notch filter output is determined for nominal hardware (limit parts specification for example 7% lean or rich) and then determined at the emission fault hardware (near 20% lean or rich), the last one defining the threshold value for the Notch filter.

At 310, before further processing the engine speed values, the method includes normalizing the engine speed value of each cylinder with respect to variations in crankshaft angle. As elaborated with reference to FIG. 8, discrete crankshaft acceleration (or torque) calculations are derived from a half pip timer. The controller uses logic to first calculate the crankshaft velocity and then the crankshaft acceleration. As such, three time stamped events are needed for a final crankshaft acceleration/torque calculation in a 4 cylinder engine. A normalizing process then follows wherein a known variation is adapted to equalize the magnitude of the first harmonic with known injectors and a predetermined imbalance level. During the normalizing process, as elaborated with reference to FIG. 10, engine torque variations are first calculated from engine speed values derived from crankshaft sensor tooth timing snapshots. Then the values are normalized based upon the spark advance and torque demand at the given engine speed-load.

At 312, method 300 includes applying a notch filter to the sampled data at a specified frequency. The specified frequency may correspond to the sampling frequency. In one example, the filtering includes setting the Notch filter to a frequency of once per engine cycle. Thus, a discrete Notch filter is applied at a frequency to extract different components of engine speed frequency content. The output is then referred to as to the notch filter output. A transfer function of the filter in the crank angle domain may be given as:

$$G(z_\theta) = K_f \frac{1 - 2 \cdot \cos \omega_n \cdot z_\theta^{-1} + z_\theta^{-2}}{1 - 2 \cdot r \cdot \cos \omega_n \cdot z_\theta^{-1} + r^2 \cdot z_\theta^{-2}}$$

wherein, G is the discrete time domain transfer function of the Notch filter, $K_f$ is the gain, $z_\theta$ is the delay operator, and $\omega$ is the frequency of interest.

$$\omega_n = \frac{2\pi}{f_s} f_n$$

$$K_f = \begin{cases} 1 & \text{if } f_n = 0 \\ \frac{1 - 2 \cdot r \cdot \cos(\omega_n) + r^2}{2 - 2 \cdot \cos(\omega_n)} & \text{if } f_n \neq 0 \end{cases}$$

$$f_s = 12$$

$$f_n = 0, 1, \ldots 6$$

$$r = 0.99$$

For a 6 cylinder engine, fs (sampling frequency) is 12 (considering 12 samples per engine cycle). fn is the frequency of interest.

At 314, the method includes subtracting the Notch filter output from the originally sampled signal to obtain a frequency content of the cylinder, in particular, a frequency of interest wave. The resulting signal is the first sine term in the Fourier series of the engine speed signal and is defined as: M1(θ)=|M1|sin (θ+φ)

At 316, the frequency content of the cylinder is compared to a threshold, the threshold based on the frequency content of a cylinder when no imbalance is present. For example, a magnitude of the frequency content may be compared to a threshold. Based on the comparison, it is determined if the frequency content indicates cylinder imbalance is present. In particular, the cylinder imbalance causes the first component of the frequency content to be non-zero (as compared to that of a healthy engine) and the wave analysis corresponding to this frequency is used for fault detection (as elaborated with reference to FIG. 7). Further, based on the magnitude and the phase of the frequency content, a directionality of the imbalance may be determined. In one example, if the frequency content is greater than the threshold, it may be indicated that an imbalance condition exists.

If an imbalance is not determined, the routine moves on to 318 wherein no cylinder imbalance is indicated, such as by maintaining an imbalance flag cleared. In addition, at 320, in response to an indication of no cylinder imbalance, engine air and fuel parameters are maintained.

In comparison, if a cylinder imbalance is determined, at 322, cylinder imbalance is indicated, such as by setting a diagnostic code or flag. In addition, at 322, engine air/fuel parameters may be adjusted based on the indication of cylinder imbalance to correct the imbalance.

Figure 10:
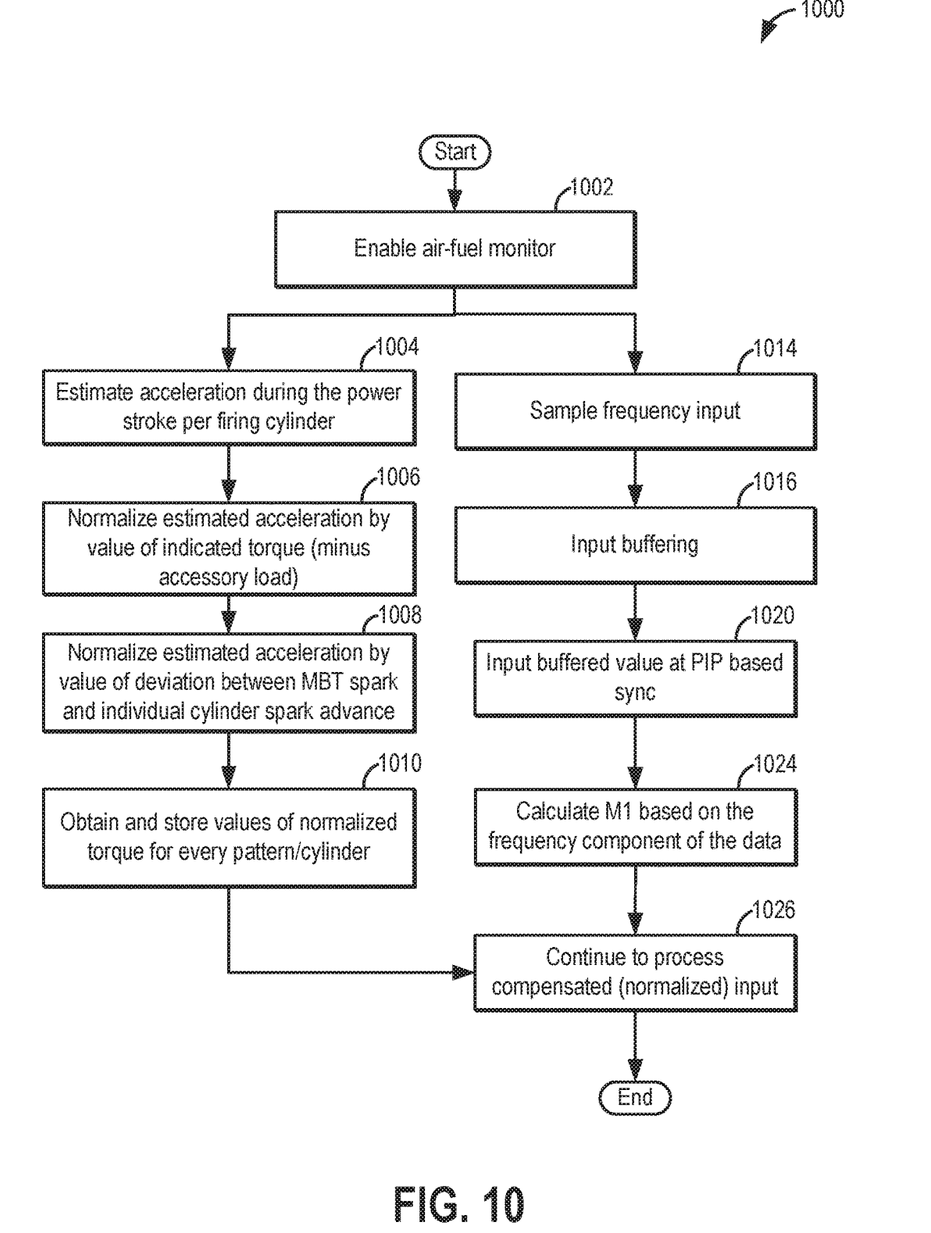
FIG. 10 presents an example flow chart illustrating the signal normalizing process.

Referring now to FIG. 10, an example method 1000 for normalization of sampled signals is described. In one example, method 1000 may be performed as part of the routine of FIG. 3, such as at step 310, such as once every PIP.

At 1002, the method includes enabling the air-fuel monitor. From there, the method proceeds to normalize the sampled signals in a first approach based on spark deviation, as detailed at 1004-1010, as well as to normalize the sampled signals in a second approach based on tooth wheel profile, as detailed at 1014-1026. As such, both normalization approaches are performed concurrently.

At 1004, the method includes estimating the acceleration during the power stroke per firing cylinder. In particular, the estimated acceleration is based on a position of a time stamp corresponding to the sampled signal within the power stroke (e.g., based on whether the signal was sampled at the beginning, middle, or end of the power stroke). For example, the torque is determined as a product of a scalar and the estimated acceleration. The final acceleration value is calculated per half pip and then one sample later (another half pip late), the required synchronization, when binned in the appropriate cell, is related to the estimated cylinder acceleration.

At 1006, the method includes normalizing the estimated acceleration by the value of the indicated torque minus any accessory loads. At 1008, the estimated scaled acceleration is normalized by the value of deviation between spark at MBT and spark advance applied to the cylinder (that is, based on the cylinder's spark ratio). This includes applying a scaler to the normalized torque close to 1 at ideal conditions (operating at stoichiometry and with spark at MBT). For example, the controller may calculate the delta between MBT and actual spark advance for a given cylinder. For non-split injection of fuel in the cylinder, the controller determines the correction coefficient using a predetermined function look-up table. The controller then calculated the final normalized torque estimate. The final scalar normalizer is precalibrated. The value of the scalar normalizer is determined at ideal MBT conditions such that the ratio of the estimated acceleration and tq_ind_led (indicated torque from aircharge at optimum spark and with lambda=1) is near 1. At 1010, the attributes of the completed patterns are stored. In particular, the determined values of normalized torque for every cylinder/every pattern is stored. As such, it is also known that the two primary factors that can affect timing input to crankshaft acceleration calculation are (i) cylinder location with respect to crankshaft and crankshaft position sensor (CKP) location, also known as torsional variations and (ii) "profile" of the tooth wheel, such as geometry variations and such. For those two factors, the experimental data with actual hardware are mapped to obtain the deviation of the frequency signal from the ideal harmonics at the firing frequency. The final magnitudes are corrected with an experimentally determined correction factor. Those parameters may affect the magnitude of the [M] component of the first harmonic defined by the Notch filter as $M1(\theta)=[M1]\sin(\theta+\varphi)$.

Thus, at 1014, the method include sampling the crankshaft speed input. At 1016, the method includes input buffering. The buffer may include the number of samples required to calculate the frequency components based on the equation discussed earlier at pages 13-14. In one example, three samples are required: a current sample, a backsample, and a back-backsample. At 1024, the method moves to extract the frequency components based on the buffered data.

From each of 1024 and 1010, the method moves to 1026 wherein the compensated (normalized) input is further processed (and the routine returns to FIG. 3, such as at step 312).

Figure 4:
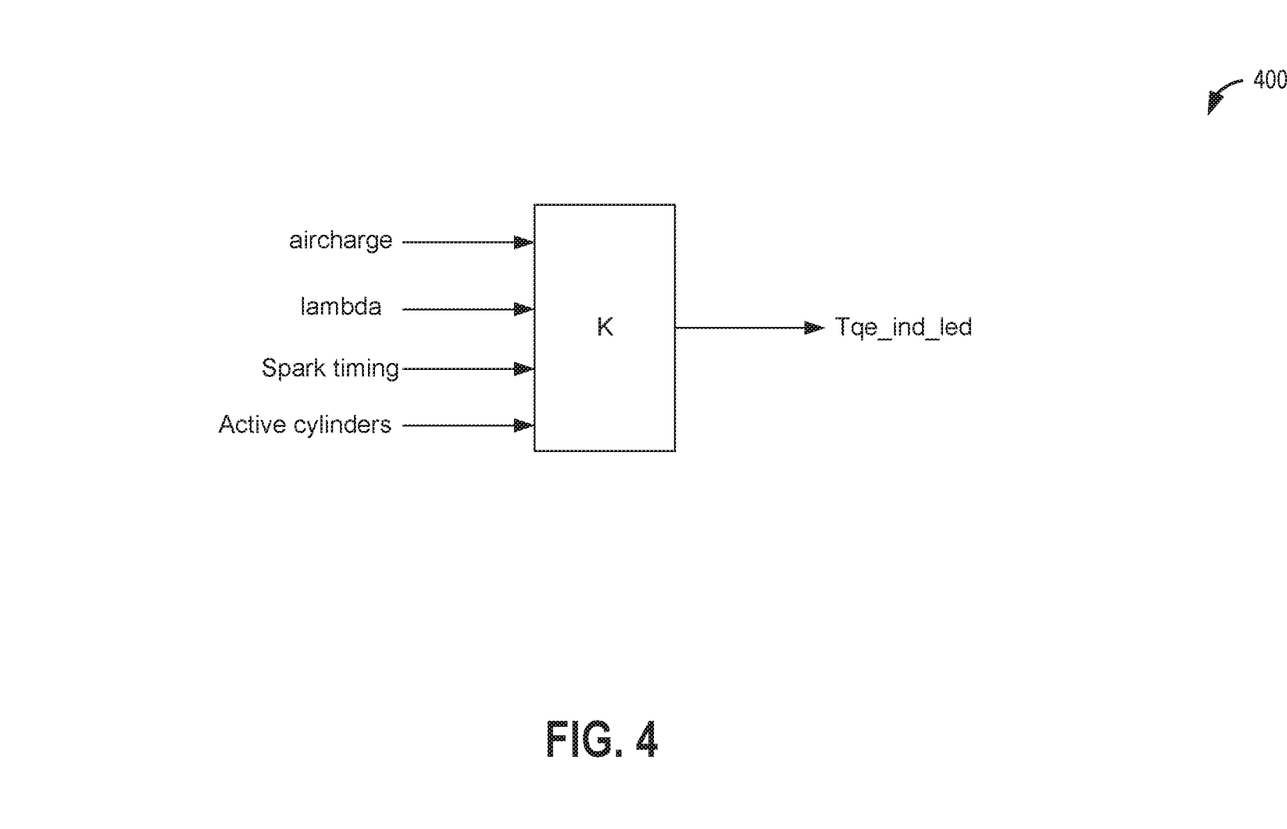
FIG. 4 presents an example torque model.

Referring now to FIG. 4, map 400 depicts an example torque model overview. The torque modeling includes the determination of an indicated torque (tq_ind_led) by a controller K. The indicated torque is derived from an aircharge estimate assuming optimum spark timing (at MBT) and optimum lambda (of 1 or stoichiometry) with all cylinders of the engine active and fueled.

Figure 5:
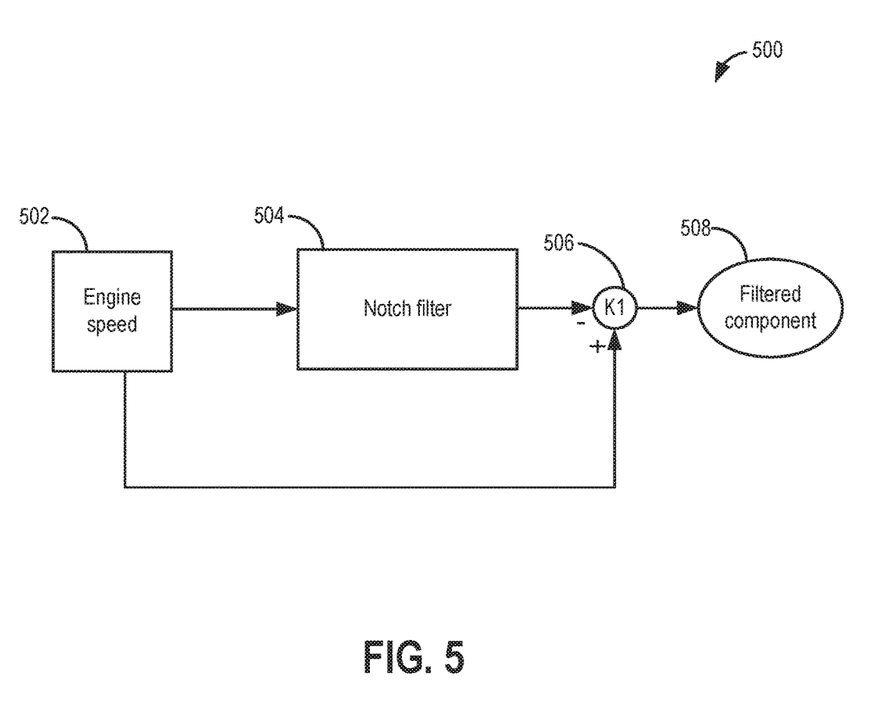
FIG. 5 shows a schematic diagram of an example of signal processing of engine speed using a Notch filter.

Turning now to FIG. 5, a block diagram 500 depicting the signal processing of an engine speed signal through a Notch filter is shown. The signal processing enables the low frequency harmonics of the signal to be assessed. A jump in the first component of the frequency spectrum (that is, the frequency one period per engine cycle) is used to infer cylinder torque imbalance. Engine speed signal 502 is passed through a discrete Notch filter 504 to obtain a processed signal or Notch filter output 506. By subtracting the processed signal 506 from the engine speed signal 502, which is the original signal, a filtered component is obtained that may represent the first frequency content of the engine speed. By comparing this first frequency content to a reference or threshold value, cylinder imbalance is determined.

Turning now to FIG. 6, map 600 depicts an example change in the frequency response of a notch filter. The top graph (plot 602) depicts the magnitude of the frequency response while the bottom graph (plot 604) represents the phase. The x-axis shows the normalized frequency with response to the firing frequency. The filter passes all frequencies unaltered except the frequency of interest (the first frequency).

Turning now to FIG. 7, map 700 depicts an example change in the magnitude of the frequency spectrum of an engine speed signal with changing degree of imbalance. As can be seen by comparing the plot for a healthy engine with no imbalance (solid line) with those of engines with increasing degrees of imbalance (see plots with dashed or dotted lines), the first frequency content of the wave jumps as imbalance increases. Specifically, the balanced engine shows a zero first frequency content while the imbalanced engines show a non-zero first frequency content, the non-zero content increasing as the engine imbalance (lean or rich, lean depicted in the given example) increases.

Figure 8:
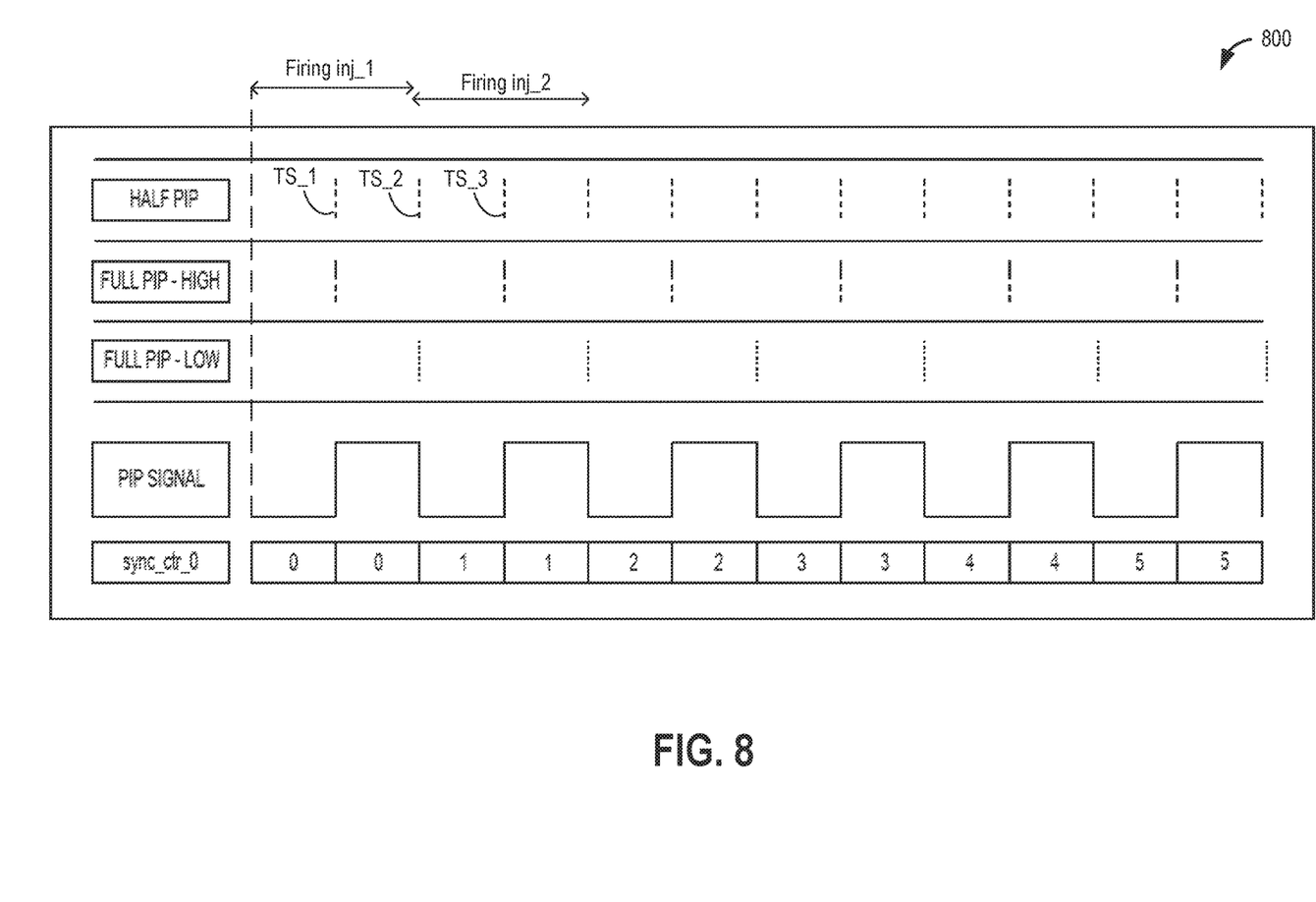
FIG. 8 shows an example of the Normalizing process.

Turning now to FIG. 8, map 800 depicts the process of normalizing or adapting the variation in engine speed signal to equalize the magnitude of the first harmonic with known injectors and predetermined imbalance level. Cylinder firing is denoted by Firing_inj_1 and 2. Time stamps are depicted as TS_1, TS_2, TS_3. The controller may determine engine speed for each firing event as follows:

$$\text{Velocity\_1}=(TS\_2-TS\_1)/\Delta\text{Time};$$

$$\text{Velocity\_2}=(TS\_3-TS\_2)/\Delta\text{Time};$$

$$\text{Acceleration}=(\text{Velocity\_1}-\text{Velocity\_2})/\Delta\text{Time};$$

TQ~Acceleration;

Acceleration is 3 samples later. Sync_ctr_0 is used to synchronize acceleration with firing.

Figure 9:
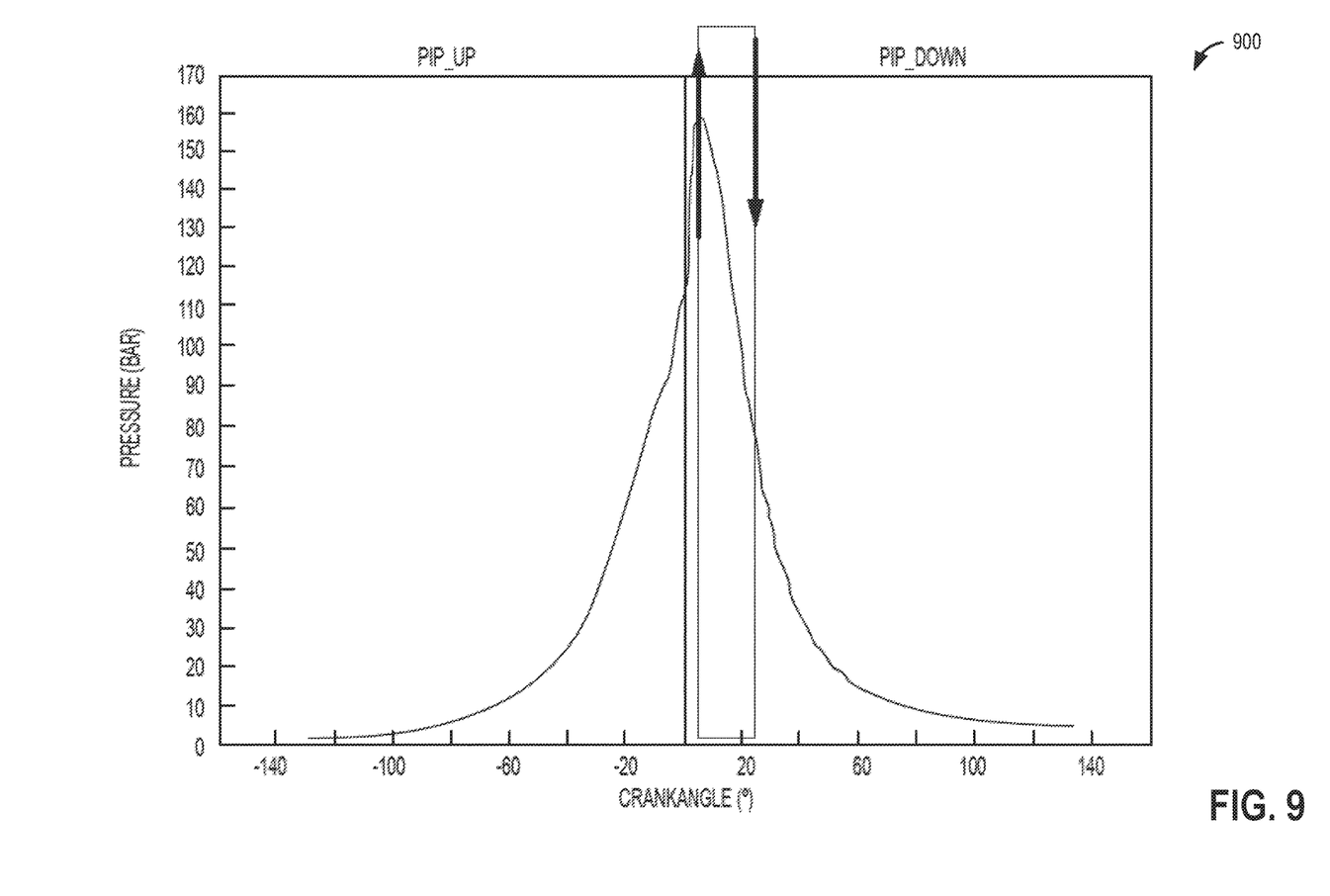
FIG. 9 shows an example of two PIP sampling per firing cycle.

FIG. 9 shows the so called half PIP sampling at map 900. Therein the signal is sampled on the up/down interrupt. FIG. 9 also depicts the limitation of the sampling in response to synchronization to MBT. With a small phase shift in synchronization, a large difference in acceleration results that can impact the final torque estimation. This emphasizes the need for faster than half PIP sampling. In particular, the first half of the curve (ascending part) shows a pip-up transition while the second half of the curve (descending part) shows a pip-down transition. The torque acceleration snapshot for both transitions illustrates the issues encountered with two PIPs sampling for a firing cycle.

In this way, the appearance of low frequency harmonics in a notch filtered engine speed signal that jump up in the first component of the frequency spectrum can be advantageously used to detect cylinder-to-cylinder torque imbalance. By then using the attributes of the low frequency harmonics (including their magnitude, amplitude, etc.) to identify the magnitude and nature of the imbalance, appropriate mitigating actions may be performed. By relying on a Notch filtered output, the time and cost involved in detecting cylinder-to-cylinder torque imbalances is reduced. As such, the use of the Notch filter allows normalization to be simplified, reducing computation time and costs. In addition, the air-fuel ratio imbalance can be reliably determined without requiring computational complexity. Overall, the technical effect of ascertaining cylinder AFR with a higher degree of accuracy is enabling adjustments to engine operation based on detected AFR imbalance. Accordingly, engine performance may be enhanced and emissions may be reduced.

In one example, a method comprises sampling an engine speed signal synchronous with engine firing; filtering the sampled engine speed signal via a Notch filter; and indicating a cylinder air/fuel imbalance based on an output of the Notch filter relative to a threshold. In the preceding example, additionally or optionally, the filtering includes setting the Notch filter to a frequency of once per engine cycle. In any or all of the preceding examples, additionally or optionally, the indicating includes indicating a magnitude of the imbalance based on a magnitude of a deviation of the Notch filter output relative to the threshold. In any or all of the preceding examples, additionally or optionally, indicating cylinder air/fuel imbalance includes indicating a deviation of an air/fuel ratio of the cylinder from a predetermined air/fuel ratio, the predetermined air/fuel ratio including stoichiometry. In any or all of the preceding examples, additionally or optionally, the method further comprises, before the filtering, excluding engine speed signal variations of the crankshaft, the excluded engine speed signals not used for indicating the cylinder air/fuel imbalance. In any or all of the preceding examples, additionally or optionally, the method further comprises adjusting one or more engine operating parameters in response to the indicating of cylinder air/fuel imbalance. In any or all of the preceding examples, additionally or optionally, sampling the engine speed signal includes sampling an output of a crankshaft sensor coupled to a crankshaft, the method further comprising correcting the sampled engine speed signal based on a learned tooth wheel profile of the crankshaft. In any or all of the preceding examples, additionally or optionally, the tooth wheel profile of the crankshaft is learned once during an initial engine operation, and then maintained during subsequent engine operation. In any or all of the preceding examples, additionally or optionally, the Notch filter has an infinite impulse response, and wherein a frequency of the Notch filter is based on a frequency of the sampling. In any or all of the preceding examples, additionally or optionally, sampling engine speed signals includes, for a given engine cylinder, sampling the engine speed signal during a power stroke of the cylinder, the method further comprising, before the filtering, normalizing the sampled engine speed signal for the given engine cylinder based on a time of the sampling within the power stroke. In any or all of the preceding examples, additionally or optionally, the normalizing includes reducing torque of the given engine cylinder based on deviation of spark timing from MBT spark at the time of sampling within the power stroke.

Another example method for an engine comprises: sampling crankshaft acceleration during a power stroke of a firing cylinder; normalizing the sampled acceleration based on a time of the sampling within the power stroke; filtering the normalized sampled acceleration via a band stop filter; and when noise at the filter is lower, indicating cylinder air/fuel imbalance based on the output of the band stop filter relative to a threshold. In the preceding example, additionally or optionally, the method further comprises, when noise at the filter is higher, indicating cylinder air/fuel imbalance based on an exhaust air-fuel ratio sensor while disregarding the output of the band stop filter. In any or all of the preceding examples, additionally or optionally, the method further comprises adjusting an engine operating parameter based on the indicated cylinder air/fuel imbalance. In any or all of the preceding examples, additionally or optionally, the method further comprises setting a parameter of the band stop filter based on the normalizing, wherein the band stop filter includes a Notch filter, wherein the parameter includes a band width and a band frequency of the band stop filter. In any or all of the preceding examples, additionally or optionally, the setting includes widening the band of the band stop filter as a degree of the normalizing increases. In any or all of the preceding examples, additionally or optionally, the normalizing includes correcting the sampled acceleration based on geometry variations corresponding to a learned crankshaft tooth wheel profile; and reducing torque of the given engine cylinder based on deviation of spark timing from MBT spark at the time of the sampling.

Another example engine system comprises: an engine including a plurality of cylinders; a fuel injector for delivering fuel to at least one of the plurality of cylinders; an intake throttle coupled to an intake passage of the engine; a crankshaft sensor coupled to a crankshaft tooth wheel; and a controller. The controller may be configured with computer-readable instructions stored on non-transitory memory for: sampling an output of the crankshaft sensor synchronous with a cylinder firing event; correcting the sampled output based on a learned tooth wheel profile; normalizing the corrected sampled output based on a timing of the sampling relative to a power stroke of the cylinder firing event; filtering the corrected output via a Notch filter, a parameter of the Notch filter based on a frequency of the sampling; estimating a cylinder air/fuel imbalance based on the filtering; and adjusting one or more of the intake throttle and the fuel injector based on the estimated cylinder air/fuel imbalance. In the preceding example, additionally or optionally, the normalizing includes estimating an engine torque based on engine acceleration corresponding to the corrected sampled output; estimating a spark timing at the time of sampling; and reducing the estimated engine torque as the spark timing at the time of sampling deviates from MBT spark, the deviation based on the time of sampling relative to the power stroke, the deviation larger when the time of sampling is at a beginning or end of the power stroke, the deviation smaller when the time of sampling is at a middle of the power stroke. In any or all of the preceding examples, additionally or optionally, the controller includes further instructions for adaptively adjusting a band width of the Notch filter based on the normalizing, the band width widened when the deviation is larger.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
sampling an engine speed signal synchronous with engine firing;
filtering the sampled engine speed signal via a Notch filter; and
indicating a cylinder air/fuel imbalance based on an output of the Notch filter relative to a threshold;
adjusting one or more engine operating parameters in response to the indicating of cylinder air/fuel imbalance.

2. The method of claim 1, wherein the filtering includes setting the Notch filter to a frequency of once per engine cycle.

3. The method of claim 1, wherein the indicating includes indicating a magnitude of the imbalance based on a magnitude of a deviation of the Notch filter output relative to the threshold.

4. The method of claim 1, wherein indicating cylinder air/fuel imbalance includes indicating a deviation of an air/fuel ratio of the cylinder from a predetermined air/fuel ratio, the predetermined air/fuel ratio including stoichiometry.

5. The method of claim 1, further comprising, before the filtering, excluding engine speed signal variations of the crankshaft, the excluded engine speed signals not used for indicating the cylinder air/fuel imbalance.

6. The method of claim 1, wherein sampling the engine speed signal includes sampling an output of a crankshaft sensor coupled to a crankshaft, the method further comprising correcting the sampled engine speed signal based on a learned tooth wheel profile of the crankshaft, where the corrected sampled engine speed is then filtered via the Notch filter.

7. The method of claim 6, wherein the tooth wheel profile of the crankshaft is learned once during an initial engine operation, and then maintained during subsequent engine operation.

8. The method of claim 1, wherein the Notch filter has an infinite impulse response, and wherein a notch frequency of the Notch filter is based on a frequency of the sampling.

9. The method of claim 1, wherein sampling engine speed signals includes, for a given engine cylinder, sampling the engine speed signal during a power stroke of the cylinder, the method further comprising, before the filtering, normalizing the sampled engine speed signal for the given engine cylinder based on a time of the sampling within the power stroke, wherein the normalized engine speed is then filtered via the Notch filter.

10. The method of claim 9, wherein the normalizing includes reducing torque of the given engine cylinder based on deviation of spark timing from MBT spark at the time of sampling within the power stroke.

11. A method for an engine, comprising:
sampling crankshaft acceleration during a power stroke of a firing cylinder;
normalizing the sampled acceleration based on a time of the sampling within the power stroke;
filtering the normalized sampled acceleration via a band stop filter; and
when noise at the filter is lower, indicating cylinder air/fuel imbalance based on the output of the band stop filter relative to a threshold;
adjusting an engine operating parameter based on the indicated cylinder air/fuel imbalance.

12. The method of claim 11, further comprising, when noise at the filter is higher, indicating cylinder air/fuel imbalance based on an exhaust air-fuel ratio sensor while disregarding the output of the band stop filter.

13. The method of claim 11, further comprising setting a parameter of the band stop filter based on the normalizing, wherein the band stop filter includes a Notch filter, wherein the parameter includes a band width and a band frequency of the band stop filter.

14. The method of claim 13, wherein the setting includes widening the band of the band stop filter as a degree of the normalizing increases.

15. The method of claim 11, wherein the normalizing includes:
correcting the sampled acceleration based on geometry variations corresponding to a learned crankshaft tooth wheel profile; and
reducing torque of the given engine cylinder based on deviation of spark timing from MBT spark at the time of the sampling.

16. An engine system, comprising:
an engine including a plurality of cylinders;
a fuel injector for delivering fuel to at least one of the plurality of cylinders;
an intake throttle coupled to an intake passage of the engine;
a crankshaft sensor coupled to a crankshaft tooth wheel; and
a controller with computer-readable instructions stored on non-transitory memory for:
sampling an output of the crankshaft sensor synchronous with a cylinder firing event;
correcting the sampled output based on a learned tooth wheel profile;
normalizing the corrected sampled output based on a timing of the sampling relative to a power stroke of the cylinder firing event;
filtering the corrected output via a Notch filter, a parameter of the Notch filter based on a frequency of the sampling;
estimating a cylinder air/fuel imbalance based on the filtering; and
adjusting one or more of the intake throttle and the fuel injector based on the estimated cylinder air/fuel imbalance.

17. The system of claim 16, wherein the normalizing includes:
estimating an engine torque based on engine acceleration corresponding to the corrected sampled output;
estimating a spark timing at the time of sampling; and
reducing the estimated engine torque as the spark timing at the time of sampling deviates from MBT spark, the deviation based on the time of sampling relative to the power stroke, the deviation larger when the time of sampling is at a beginning or end of the power stroke, the deviation smaller when the time of sampling is at a middle of the power stroke.

18. The system of claim 17, wherein the controller includes further instructions for adaptively adjusting a band width of the Notch filter based on the normalizing, the band width widened when the deviation is larger.

* * * * *